May 4, 1954          C. SASSETTI          2,677,338
VEHICLE SAFE
Filed May 6, 1950                                 2 Sheets-Sheet 1
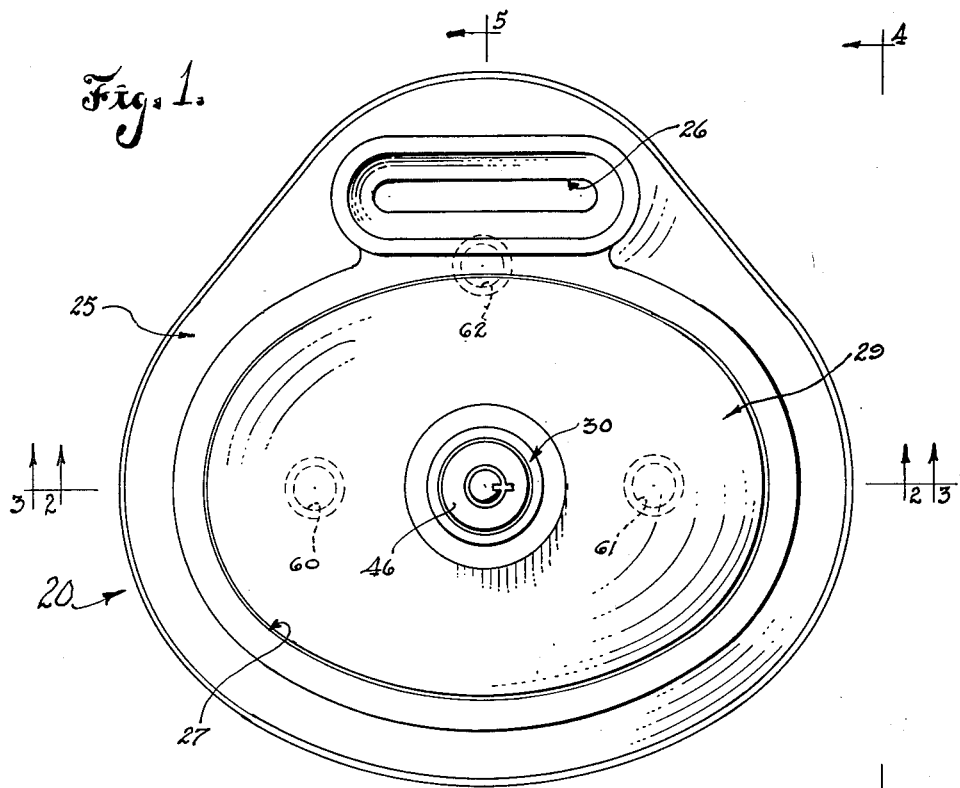
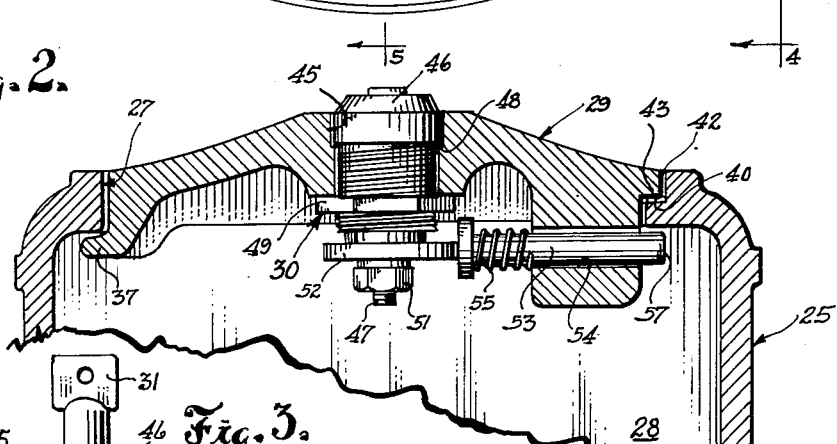
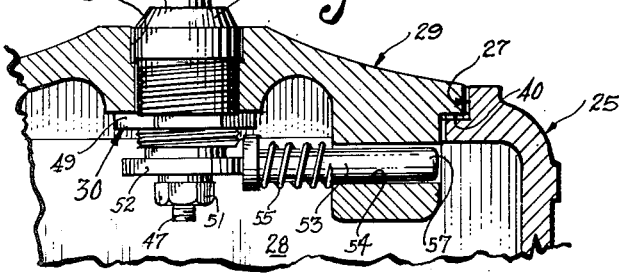
INVENTOR:
Charles Sassetti
By Joseph M. Gartner
ATTY.

May 4, 1954
C. SASSETTI
2,677,338
VEHICLE SAFE
Filed May 6, 1950
2 Sheets-Sheet 2
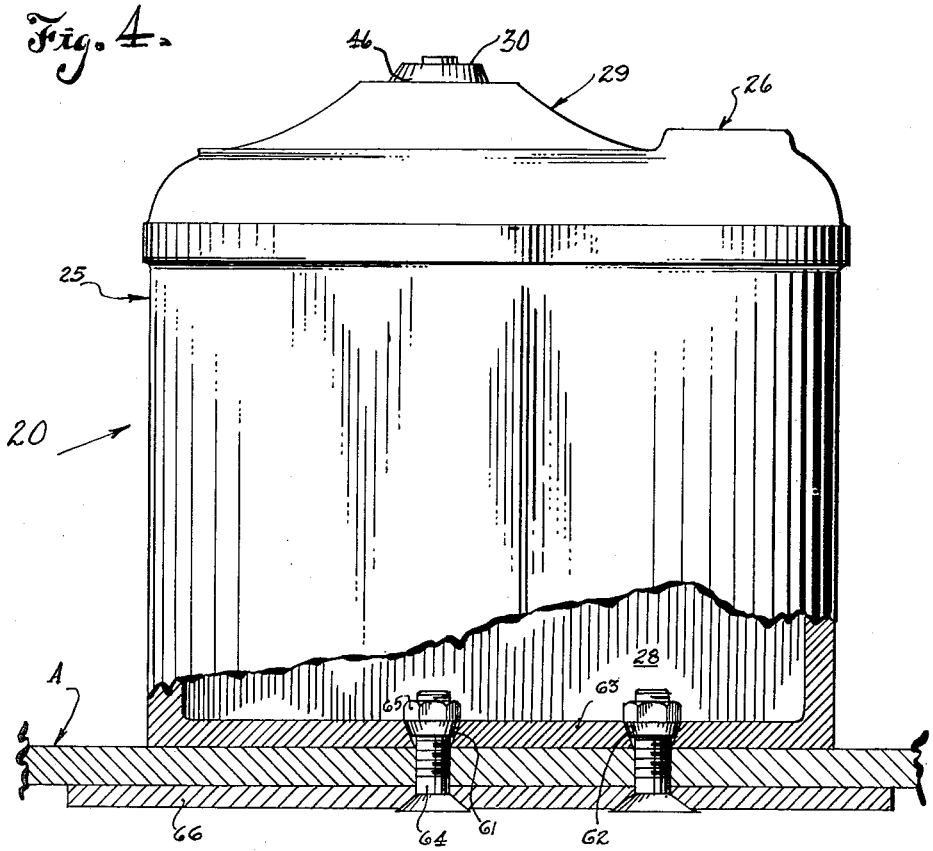
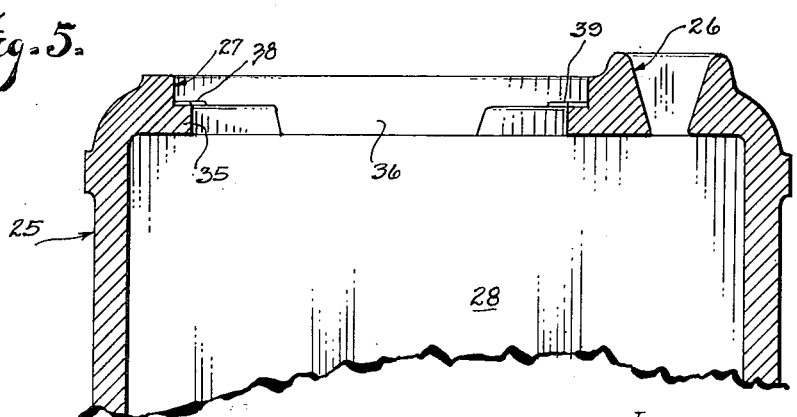
INVENTOR:
Charles Sassetti
By: Joseph M. Gartner
ATTY.

Patented May 4, 1954

2,677,338

UNITED STATES PATENT OFFICE 2,677,338

VEHICLE SAFE

Charles Sassetti, Oak Park, Ill., assignor, by mesne assignments, to John Kelleher, Berwyn, Ill.

Application May 6, 1950, Serial No. 160,555

1 Claim. (Cl. 109—59)

This invention relates, in general, to the class of receptacles that are employed for the safe keeping of money and other property of valuable sorts, and is particularly concerned with safes of relatively small dimension and adapted for universal application in the employment thereof as a vehicle safe or in a dwelling, whereby such money or other valuable property may be made secure against theft.

The invention has particular significance to the employment thereof as a vehicle safe, whereby the safe may be securely anchored to the floor or a wall of the vehicle such as, for example, a laundry delivery truck, a milk delivery truck and any other vehicle which employs a driver who, of necessity, will carry amounts of money for making change and the like in the payment of bills, the instant safe being constructed so that it will be practically impossible for thieves or unauthorized persons to open the safe or to remove the safe from its anchored position, thereby relieving such drivers from the grave responsibility of the care and safe-keeping of the money in their possession. Moreover, the invention offers to such drivers a measure of protection from harm in that thieves would realize that the driver would not have the money on his person and that the driver could not open the safe.

It is recognized that in the prior art, numerous attempts have been made to provide safes for money and/or other valuable articles; however, these prior art safes could not be adapted to advantage for the purposes contemplated by this invention and, to the best of the applicant's knowledge, only very few of the prior art structures have had limited successful application and have been accorded only limited commercial recognition. It is believed that this fact results from the apparent deficiencies of the prior art structures, their nonadaptability for universal application, and their expensive construction which so greatly increased the cost as to seriously handicap general sales acceptance.

The present improvements in safes are directed to simplify the construction and the mode of operation thereof, and also to provide a unitary assembly of relatively small dimension which may readily and conveniently be employed universally for anchorage to a floor or wall of a motor vehicle or in the floor or wall of a building, and including means to effectually prevent the removal or opening of the safe by persons other than those holding keys for the lock and at the same time completely frustrating efforts to gain access to the anchoring means.

Therefore, it is an important object and accomplishment of the invention to provide a safe of relatively small dimension and particularly designed for employment in an automotive vehicle or in the household and the like for the storage and safe keeping of money or other valuables and which is of simple construction and which may withstand abuse against injury due to an attempt to demolish the safe to gain access to the inside thereof.

Another object and accomplishment of the invention is to provide for automotive vehicles and household use an improved safe by co-relating and especially designing the various elements thereof, whereby there shall be such cooperation between the improved elements as will best serve the purpose of providing an efficient unit capable of being manufactured at low cost and yet giving the maximum of satisfactory service in use.

The invention seeks, as a further object and accomplishment, to provide a safe as contemplated herein and particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as hereinafter more fully described, and as more particularly pointed out in the appended claim.

With the above and other marked improvements and superiorities which distinguish it from presently known structures, these improvements in the invention residing in the novel construction and cooperative function of the parts thereof, the combination of the parts and the arrangement thereof as illustrated in the drawings, and which will be more fully described hereinafter and particularly pointed out in the claim.

In the accompanying drawings on which there is shown a preferred embodiment of the invention, Fig. 1 is a top plan view of a safe embodying the features of the instant invention and illustrating the relative disposition of the money receiving opening with respect to the removable cover;

Fig. 2 is a fragmentary sectional view of the upper portion of the safe depicted in Fig. 1 and being taken substantially on the plane of the line 2—2 in Fig. 1 and illustrating the relative disposition of parts when the cover is in the locked position;

Fig. 3 is a fragmentary sectional view of the upper portion of the safe depicted in Fig. 1 and being taken substantially on the plane of the line 3—3 in Fig. 1 and illustrating the relative disposition of the parts when the cover is in the unlocked position;

Fig. 4 is a side elevational view of the safe depicted in Fig. 1 and being taken substantially on the plane of the line 4—4 in Fig. 1 and with portions thereof shown in section to more clearly illustrate the manner of anchoring the safe; and Fig. 5 is a fragmentary sectional view of the safe depicted in Fig. 1 and being taken substantially on the plane of the line 5—5 in Fig. 1 to more clearly illustrate the construction at the upper portions thereof and with the cover removed.

The drawings are to be understood to be more or less of a schematic character for the purpose of illustrating and disclosing typical or preferred forms of the improvements contemplated herein and in the drawings like reference characters identify the same parts in the several views.

As one possible example of advantageous employment of the safe contemplated by this invention, reference is made to the drawings, particularly Fig. 4, wherein there is illustrated the safe with which the present invention is particularly concerned and generally indicated in its entirety by the numeral 20 as being secured in operative position to the floor board or fire wall of an automotive vehicle, said floor board being indicated by the letter A. For purposes of illustration the structure A is shown as a floor board but it is obvious that this structure could be a horizontally disposed wall or, in some instances, it could be an angularly disposed wall or disposed on a vertical plane.

It is contemplated that the safe, when employed in an automotive vehicle, could be advantageously anchored to the truck steel floor board, the fire wall under the dashboard, in a corner of the truck storage space, in the trunk compartment, or any other desirable location.

When employed for household purposes the structure A may be the floor of the building or, in some cases, it may be desirable to embed the body of the safe in concrete. The various methods of advantageous installation will be explained hereinafter in detail.

Suffice it to say, since the invention is not particularly concerned with the precise construction of the floor structure A as illustrated, and/or adjacent parts, they will not be further described in detail, and it is deemed sufficient for all intentions and purposes herein contained to show only portions thereof adjacent to and cooperating with the safe contemplated herein. It is to be understood that details of construction of such floor and/or wall structures with which the safe contemplated herein may advantageously be employed may be modified to suit particular conditions or to satisfy the engineering genius of various manufacturers, and I do not wish to be limited to the construction of these elements as set forth except where such construction particularly concerns the invention contemplated herein.

Having thus described, by way of example, a possible adaptation of the instant safe, and having generally described the environment surrounding the adaptation, the specific construction and cooperative functions of the parts of the instant safe with which the present invention is particularly concerned, will now be described in detail.

In the exemplary embodiment of the invention depicted in Figs. 1, 2 and 4, the safe 20 comprises, in general, three main parts—a body 25 formed of a single casting to define a substantially triangular shape and provided in the upper portions thereof with an integrally formed money receiving opening 26 and an elliptically shaped access opening 27, each of said openings communicating with the interior of said body defined by a money storage chamber 28, an elliptically shaped cover 29 adapted to fit and enclose said opening 27, and a locking mechanism 30 operable by a key 31 and forming a part of said cover 29 but having portions thereof adapted to cooperate with portions of the body 25 adjacent said access opening 27 to effect the removable securement of the cover 29 in position as shown in Figs. 1, 2 and 4.

In order that the instant safe may withstand repeated blows from any hammer or sledge, it is preferable to form the body 25 and the cover 29 by casting of malleable iron to define the shapes as shown. Malleable iron has been found the most corrosion-resistant ferrous metal which could be applied for the intended purposes of this invention. Moreover, malleable iron possesses the necessary combination of ductility and strength which gives it high resistance to shocks and pulls and, due to its toughness, it has the ability to resist repeated pulls, twists and stresses. Because of these advantageous physical properties it permits reduction in dead weight without sacrificing strength.

Adverting to Fig. 5 wherein there is illustrated in section a portion of the upper regions of the body 25, it can be seen that the access opening 27 is provided with an integrally formed flange 35 extending inwardly from the outer edge of the opening and running completely around the peripheral edge of the opening except at one side of the opening to provide an open space 36 adapted to receive portions of a locking tongue 37 (see Figs. 2 and 3) forming an integral part of the cover 29, whereby to retain one side of the cover in the locked position.

The top surface of the formed flange 35 may be provided with integral pads as at 38, 39 and 40 which may be placed advantageously around the opening to provide a smooth bearing surface for the cover 29 when associated with the body 25. Since the body 25 is of a casting of malleable iron, it is desirable to provide means whereby a minimum amount of machining would be necessary to properly fit the parts together. This is advantageously accomplished by providing the pads 38, 39 and 40 which may be advantageously surfaced by machining, grinding or any other convenient practice. Thus, it can be seen that the finished pads advantageously provide a bearing surface for the cover 29 so that the cover will be supported at points adjacent its peripheral edge when deposited in the access opening 27.

Integrally formed with the upper portions of the body 25, there is provided the money receiving opening 26 formed to define a slot as shown in Figs. 1, 4 and 5 and in open communication with the money storage chamber 28, the money receiving opening 26 being designed to conveniently receive money for deposit in the money storage chamber and is of a dimension arranged to prevent the insertion of various devices which may be employed in an attempt to remove the contents of the safe. It is notable that when money is deposited through the opening 26, the folded bills would generally open and expand thereby hindering the removal of the money from the storage chamber 28 via the opening 26 by the employment of various devices employed by thieves for accomplishing this purpose. If the instant safe is mounted on the fire wall of an automotive vehicle, it is apparent that the safe would be at an angle with the money receiving opening 26 at the top and when money is deposited into the safe via the money receiving opening 26, the money will fall downwardly within the safe and out of reach of any persons attempting to remove the money by means of such aforementioned devices.

The cover 29 is formed of malleable iron by casting to define an elliptical shape with the locking tongue 37 extending downwardly and outwardly of the peripheral edge of the cover 29 at one side of the cover, the locking tongue 37 being adapted to be received through the open space 36 (Fig. 5) and having portions ararnged to engage the inner wall of the body 25 as shown in Fig. 2, thereby to removably hold that side of the cover in locking position.

The balance of the peripheral edge 42 of the cover 29 is provided with a flanged portion 43 matching the formed flange 35 so that these parts of the body 25 may accommodate each other when the cover is placed in position.

At the central regions of the cover there is provided a circular aperture 45 adapted to receive the locking means 30 which comprises a lock 46 which may be of the pin tumbler type, or any other suitable construction, to receive the key 31 adaptable to turn the shaft 47 to operate the locking mechanism. The lock 46 may be arranged in any suitable manner and as will be readily understood by those skilled in the art and therefore further and detailed description is omitted herein with respect to the lock and case 46. Downward movement of the lock 46 is prevented by virtue of the flange portion 48 and the lock 46 is securely held in the aperture 45 by means of the lock nut 49. Carried by the shaft and adjustably held in position therewith by means of the nut 51 is a cam 52 adapted to engage portions of a lock pin 53 carried for sliding movement in an aperture 54 forming a part of the cover 29, said locking pin 53 being spring pressed by virtue of the spring 55 so that movement of the pin would normally be to the left as shown in Fig. 2 except for the restriction in its movement by the engagement thereof with the cam 52. When the lock pin is forced to the right, it can be seen that end portions 57 will extend beyond the confines of the aperture 54 whereupon the end portions 57 may become engaged with the inner wall of the body 25 to provide a restriction to the removal of the cover from the body.

In Fig. 2, the locking pin 53 is in its extended or locked condition while in Fig. 3 it can be seen that the cam has been rotated thereby permitting the locking pin to move to the left whereupon the end portions 57 will be received into the confines of the aperture 54 and will no longer be able to engage portions of the inner wall of the body 25, thereby permitting the cover to be removed from the body.

Thus, the instant safe comprises the body 25 having the slot 26 through which money may be passed into the money storage chamber 28, said body also having the removable cover 29 which is provided with the lock 46, said lock being arranged to operate the cam 52 upon rotation of the key 31 and which cam is engageable with the spring pressed locking pin 53 adapted to move in a horizontal plane to provide the end projection 57 engageable with the interior of the body adjacent the periphery of the opening 27 when in its locked position, and the cover 29 being also retained in its position at the opposite side of the pin by means of the tongue 37 which is also engageable with the interior of the body adjacent the periphery of the opening 27.

In combination with the aforementioned features, the invention comprehends the provision of means for anchorage of the safe to a floor or wall of a motor vehicle and including means to effectually prevent removal of the safe by unauthorized persons. This is advantageously accomplished in the instant invention by the provision of three through apertures 60, 61 and 62 disposed in the bottom wall 63 of the body 25, the apertures 60 and 61 being disposed in spaced relationship with their axes equi-distant of the intersection of vertical and horizontal center lines of the cover, the axes of the apertures 60 and 61 being disposed on the horizontal center line while the axis of the aperture 62 is disposed on the vertical center line as shown in Fig. 1. In Fig. 4 it can be seen that each of the apertures are provided with tapering walls and are adapted to receive respectively bolts as at 64 adapted to receive nuts as at 65 which are provided with tapering portions adapted to engage and lock with the tapering walls of the aperture.

In order to provide a strong backing for the bolts it is preferable to position a steel plate as at 66 against the under surface of the floor board A and have countersunk apertures adaptable to receive the heads of the bolts as shown.

In Fig. 4 it can be seen that the countersinking of the bolt heads into the steel plate 66 affords a smooth surface to the under side of this plate, thereby making it hard for thieves to obtain access to the bolts for the purpose of chiseling off the bolt heads. Moreover, by placing the nuts as at 65 within the storage chamber 28, access thereto for purposes of convenient installation or removal of the safe, may be obtained only by authorized persons.

The instant safe, being formed of two simple castings with simple moving parts facilitating ease in assembly and maintenance, lends itself to mass production manufacturing principles thus affording a substantial saving in the manufacturing cost.

While I have illustrated preferred embodiments of my invention, many modifications may be made without departing from the spirit of the invention, and I do not wish to be limited to the precise details of construction set forth, but wish to avail myself of all changes within the scope of the appended claim.

I claim:

A money safe adapted for mounting in a motor vehicle and comprising a safe body of heavy cast metal and having a top wall provided with a money receiving opening defining a slot, said body having an access opening in the top wall thereof, a removable cover for said access opening with a tongue disposed on one side of the cover and arranged to engage portions of said body adjacent the access opening, said cover having a central flanged opening, a key operated lock with a flanged casing disposed in and adapted to engage with portions of said flanged opening to prevent inward movement of the lock with respect to the cover, said flanged casing having threaded portions adapted to receive nut means engageable with the inside surface of said cover adjacent said flanged opening to prevent movement of the lock outwardly of said central flanged opening, a shaft projecting from and rotatably operated by said lock responsive to manual manipulation of the key, a cam removably mounted on said shaft, a locking pin carried for relative sliding movement by said cover at the side thereof opposite to the tongue, said locking pin having spring means to urge movement of the pin in one direction and said cam being arranged to engage an end portion of said locking pin to move the locking pin in the other direction for engagement with said body adjacent said access opening to effect securement of said cover to said body.

References Cited in the file of this patent

UNITED STATES PATENTS

| Number | Name | Date |
|---|---|---|
| 1,561,449 | Armstrong | Nov. 10, 1925 |
| 1,805,759 | Chamberlain | May 19, 1931 |
| 1,854,839 | Hermann | Apr. 19, 1932 |
| 1,916,406 | Bell | July 4, 1933 |
| 2,010,877 | Morell | Aug. 13, 1935 |
| 2,098,249 | Kistner | Nov. 9, 1937 |